Dec. 15, 1925.

L. W. CALLENDER

SHOCK ABSORBER

Filed Nov. 19, 1923

1,565,905

INVENTOR

Lynn W. Callender

Patented Dec. 15, 1925.

1,565,905

UNITED STATES PATENT OFFICE.

LYNN W. CALLENDER, OF WICHITA FALLS, TEXAS.

SHOCK ABSORBER.

Application filed November 19, 1923. Serial No. 675,717.

*To all whom it may concern:*

Be it known that I, LYNN W. CALLENDER, a citizen of the United States, residing at Wichita Falls, in the county of Wichita and State of Texas, have invented a new and useful Shock Absorber, of which the following is a specification.

The invention relates to a shock absorber using oil to obtain resistance and comprising a half round housing, having a shaft disposed transversely thereof, a paddle attached to said shaft, a groove in a portion of the circumference of said shaft opposite said paddle, for the purpose of holding the fluid pressure near the end of the paddle stroke and releasing the fluid pressure near the center of the paddle stroke.

The object of this invention is to provide a shock absorber of this nature that will prevent the excessive vertical movement of a vehicle frame on rough roads.

A further object of the invention is to provide a shock absorber that will reduce the quick movement of the vehicle spring and frame.

A further object of the invention is to provide a device of this nature that is very practical and useful and can be manufactured at a very nominal cost.

The nature and advantages of the invention will be better understood when the following detail description is read in connection with the accompanying drawing forming a part of this application. The invention residing in the construction, combination and arrangement of parts as claimed.

Figure 1:
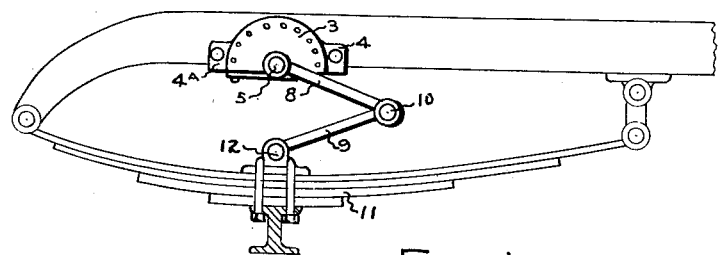

In the accompanying drawing the various parts will be referred to by numbers. And, wherein, Figure 1 is a view showing the device attached to a vehicle frame and spring.

Figure 2:
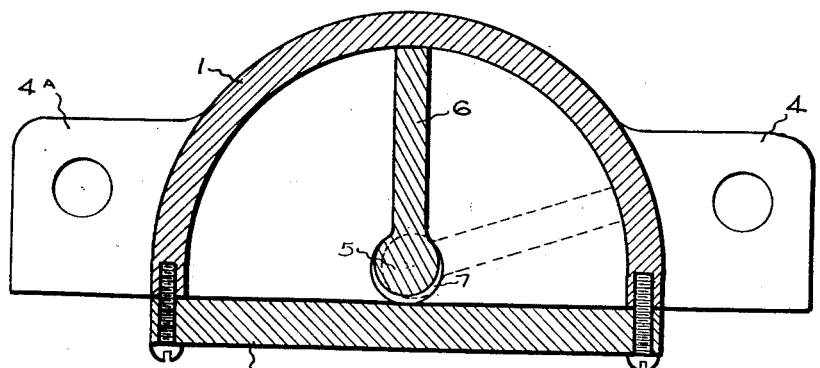

Figure 2 is an enlarged sectional view.

The device forming the subject matter of this invention comprises a half round housing 1. 2 is a cover plate attached to the bottom of said housing 1, as shown. 3 is a cover plate attached to the side of the housing 1. 4 and 4ª are brackets forming a part of the housing 1 for the purpose of attaching the same to the vehicle frame. 5 is a shaft disposed transversely in the housing 1. 6 is a paddle attached to the shaft 5. 7 is a groove arranged in a portion of the circumference of the shaft 1, opposite to the paddle 6. 8 is an arm attached to the shaft 5. 9 is an arm pivoted to the shaft 8, as shown at 10. The arm 9 is also pivoted to the spring 11, as shown at 12. The housing 1 is filled with fluid such as oil or the like.

The invention operates in the following manner: As the paddle 6 nears the end of its stroke, as shown by the dotted line in Figure 2 of the accompanying drawing, the end of the groove 7 in the shaft 5 comes in contact with the cover plate 2, thereby holding the fluid pressure and increasing the resistance to the movement of the paddle 6. As the said paddle 6 nears the center of the stroke the larger portion of the groove 7 in the shaft 5 provides a passage for the fluid from one side of the paddle to the other, thereby lessening the resistance to the movement of the paddle 6.

While it is believed from the foregoing description the nature and advantages of the invention will be readily apparent, I desire to have it understood that I do not limit myself to what is herein shown and described and that such changes may be resorted to, when desired, as fall within the scope of what is herein claimed.

What I claim is:

A shock absorber comprising a half round housing adapted to hold fluid, a shaft extending through said housing and pivotally mounted so as to turn therein, a paddle attached to said shaft and extending radially thereof to the outer wall of the housing, a groove in said shaft opposite said paddle extending about a portion of the circumference of the shaft, and a pair of arms pivoted together and rigidly connected to said shaft whereby the movement of the paddle in the oil in the housing serves to resist the movement of the arms.

LYNN W. CALLENDER.